SEIBI YAMADA & YOSHIHARU ASADA
INVENTORS

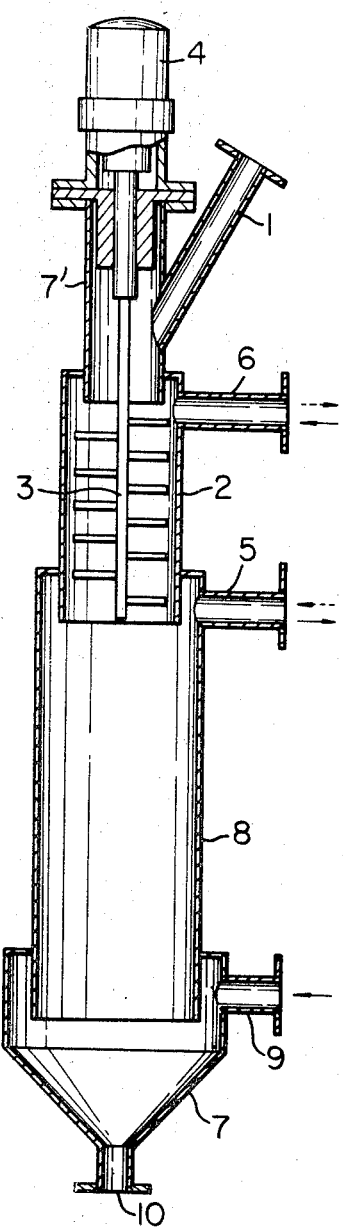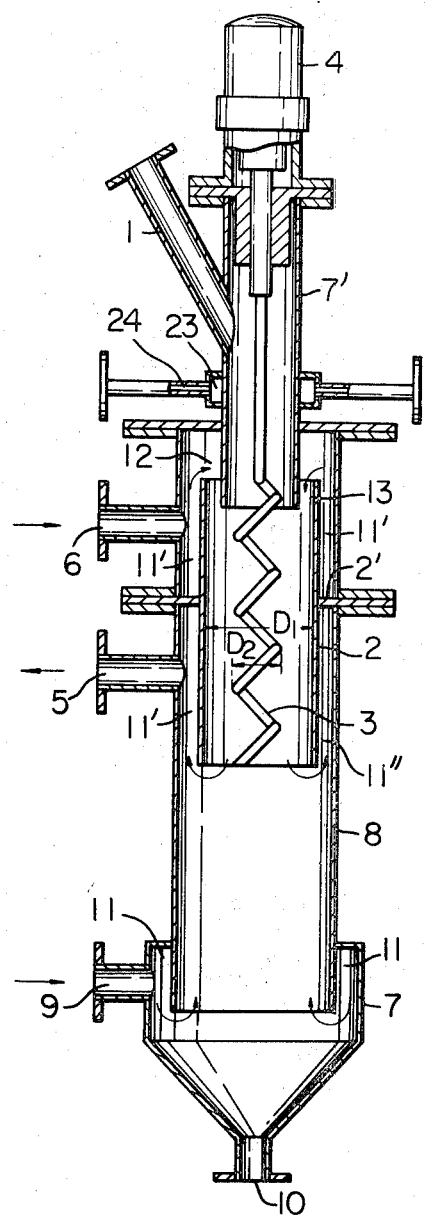

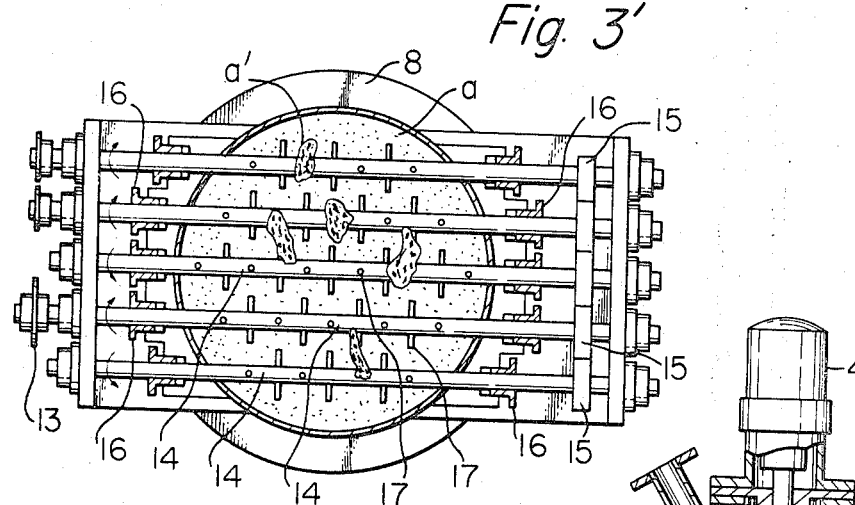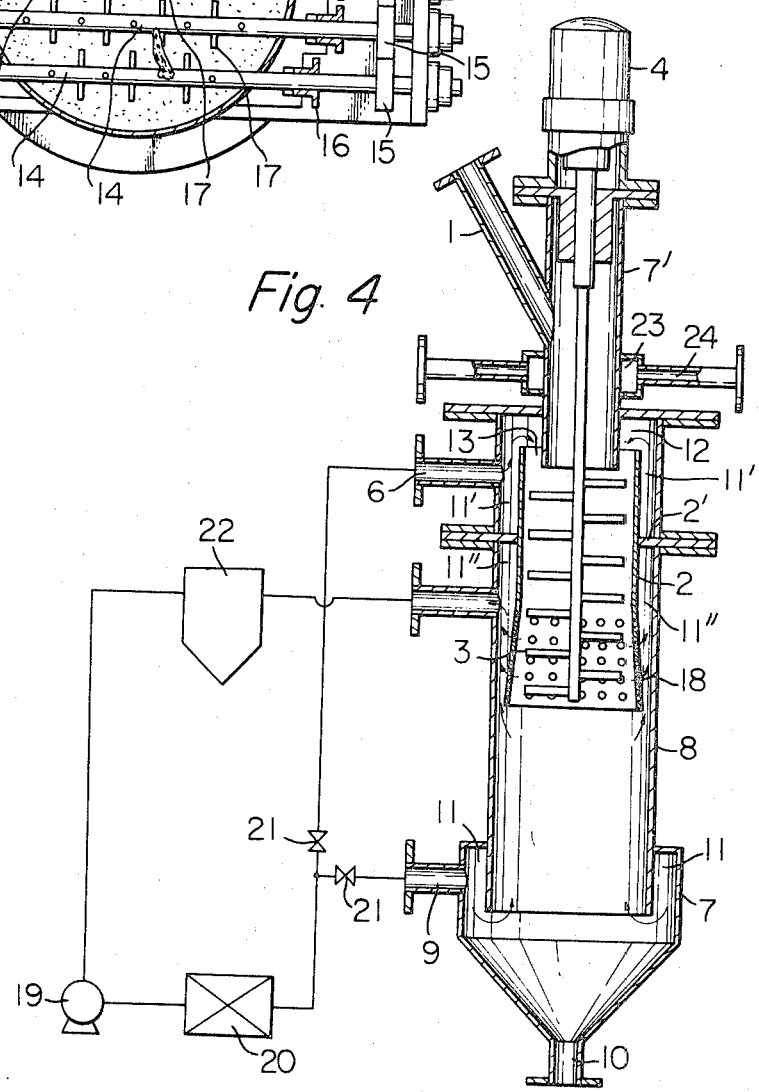

United States Patent Office 3,547,890
Patented Dec. 15, 1970

3,547,890
PROCESS AND APPARATUS FOR DRYING
POLYESTER PARTICLES
Seibi Yamada and Yoshiharu Asada, Matsuyama-shi,
Japan, assignors to Teijin Limited, Osaka, Japan
Filed Aug. 12, 1968, Ser. No. 751,896
Claims priority, application Japan, Aug. 23, 1967,
42/53,755; May 13, 1968, 43/32,040, 43/32,041,
43/32,042
Int. Cl. F26b 3/16
U.S. Cl. 260—75                              2 Claims

ABSTRACT OF THE DISCLOSURE

Process for drying polyester particles comprising the first step of heating and crystallizing non-crystalline polyester particles which are packed in such a manner that they are movable downwards by their own weight, at temperatures ranging 120°–200° C., with mechanical agitation, until at least the surfaces of the particles are substantially crystallized, and the immediately succeeding step of heating and drying the particles maintained under the packed state but without agitation, and apparatus for carrying out the process.

---

Figure 3:
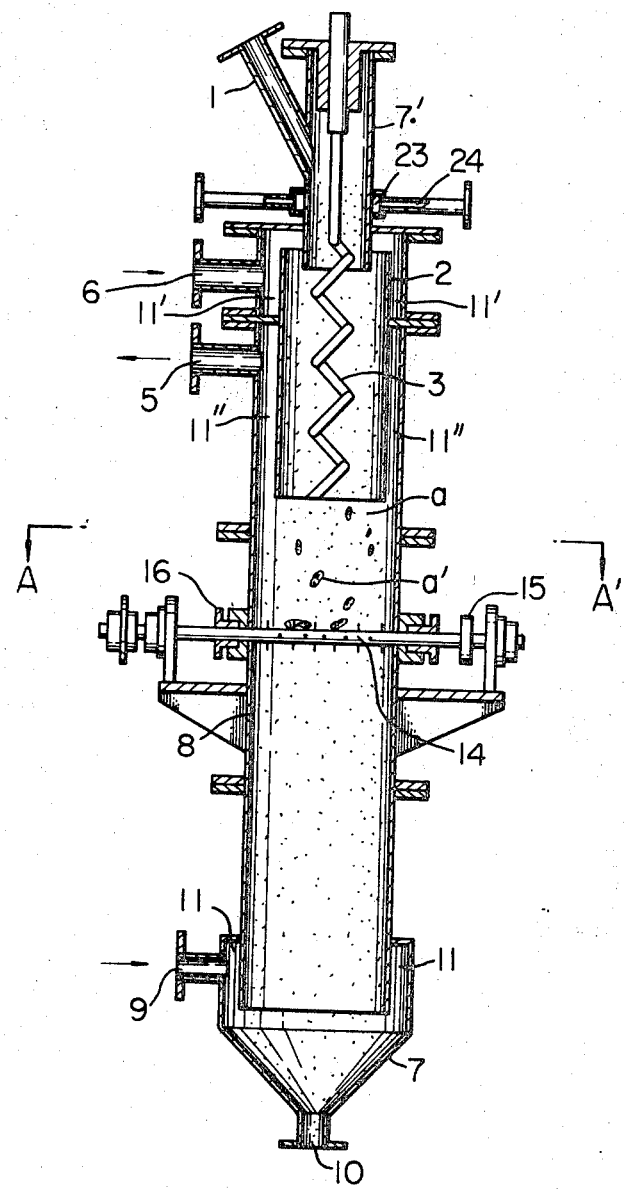

This invention relates to an improved process for drying polyester particles, and to the apparatus suited for the practice thereof. More particularly, the invention relates to a process of pre-heating non-crystalline polyester particles to cause crystallization thereof and thereafter heating and drying the crystallized particles, the characteristic features residing in that the process comprises the first step of heating and crystallizing non-crystalline particles of polyester which are packed in such a manner that they are movable downwards by their own weight, at temperatures ranging 120–200° C., preferably 150–190° C., with mechanical agitation of preferably mild conditions, until at least the surfaces of the particles are substantially crystallized, and the immediately succeeding step of heating and drying the particles maintained under the above packed state but without the agitation. The invention furthermore concerns with the apparatus for practicing the above process.

In the manufacture of various shaped articles such as fiber, film, sheet, board, rod, etc. from polymers, the polymers are dried in advance of their melting step. Whereas, polyester presents more problems for ideal drying, compared with other polymers.

When polyester containing any substantial amount of water is melted, its ester linkages are hydrolyzed to reduce its degree of polymerization. This lowering in the degree of polymerization is more of less an inherently inevitable phenomenon with polyester, which noticeably deteriorates the quality of the articles shaped from the polyester.

Furthermore, when the water content varies for each particle, and/or the water content of an agglomerate of the particles as a whole is not evenly distributed but is substantially different in different parts, the degree of quality deterioration of the shaped articles also varies appreciably. This of course seriously impairs qualitative reproducibility of the products.

Also when the drying is performed, for example, at 100° C. or above, mutual adhesion of the particles takes place to eventually form larger masses or blocks, prevents sufficient drying as well as uniform drying of each particle and/or the agglomerates. Thus, such unsatisfactory drying invites both of the above-described two problems, and the result is quite detrimental.

The occurrence of such adhesion among the particles not only renders the drying operation difficult, or in extreme cases, impossible, but inevitably invites many other operational and mechanical disadvantages, such as that it makes a re-grinding step of the dry matter essential, and renders the transfer of the dry matter to the subsequent shaping step difficult. Still in addition, the re-grinding objectionably deforms the particles, e.g., pellet form, and causes formation of fine powder; as the result adversely affecting the shaping operation as well as the quality of the shaped articles.

Among the conventional drying of polyester particles, there is a system in which the adhesion or fusion of the particles are reduced to relatively low level. For example, rotary drum-type drying machine is utilized, in which the adhesion is considerably less, presumably due to its violent rotatory agitation and/or the fact that in the machine undried particles contact more often with dried particles, rather than with other undried, adhesive particles. However, in such drying system, the aforementioned substantial deformation of pre-shaped particles cannot be avoided.

There are also other types of proposals, such as U.S. Pat. No. 3,349,499, for example, which proposes the drying of the particles in the form of a fluidized bed. However, since the crystallization step and drying step of the particles are performed in the same bed area according to the proposed process, the practical operation is considerably complex and difficult of controlling. Separately, batch-type drying has been also practiced, in which a plural number of vessels with air-permeable bottoms which are filled with the particles are placed in the drying area, so that the particles are at stand-still state when heated and dried. The resultant massive agglomerates formed by adhesion of the particles are subsequently ground. This process however requires much labor, causes objectionable variation in particle size and shape during the grinding, exhibits poor qualitative reproducibility, and is essentially impossible of continuous operation.

Still in addition, all of the foregoing processes are subject to more or less common deficiencies that they require large scale apparatuses and incur high equipment cost. Also since such large scale apparatuses cannot be directly connected to the apparatuses of the next step, such as spinning machine or molding machine, they must be installed separately. Thus the particles once dried in a drying apparatus must be transferred to the separately installed spinning or molding machine, and during the transfer the particles unevenly absorb moisture. This enhances the lowering in degree of polymerization of the polymer during melting, and appreciably impairs the quality of the spun or molded products, and/or notably degrades qualitative reproducibility of the products.

Considering the fact that the above-described numbers of drawbacks are caused, either directly or indirectly, by the adhesion phenomenon occurring in the drying step of polyester particles, it is perfectly logical to presume that the foregoing drawbacks may be avoided to a certain degree, if the non-crystalline polyester particles are first pre-heated to a temperature above their crystallizing point to be crystallized, and thereafter subjected to the drying.

It is obvious, however, if such two-stage drying requires very complex additional operations or apparatuses, or exhibits poor reproducibility of drying effect in practice, such a process is industrially disadvantageous.

We have engaged in extensive research works in the purpose of establishing a drying process with the preparatory crystallization but without the industrial disadvantages, so as to effectively overcome the foregoing many deficiencies. In the course of the studies, we encountered many disappointing outcomes indicating that the simple technical hypothesis on the advantages of advance crystallization is difficult to mature into a process which is free of the industrial disadvantages and which effectively overcomes the above-described many drawbacks.

First, improvement of the essential or serious deficiencies in the aforedescribed batch-type drying was attempted. Thus, in the purpose of preventing the adhesion of particles as much as possible by the advance crystallization and of making a continuous operation possible, a jacketed drying cylinder was designed. The jacket was divided into plural zones, and heated air current was separately supplied to each zone, so that the upper zone was given a temperature suited for crystallization of polyester pellets, and the lower zone, a temperature suited for drying. Thus a temperature gradient was formed inside the cylinder, and whereupon polyester pellets were supplied from the upper part of the cylinder to be withdrawn from the bottom thereof, the cylinder being so designed that the content thereof could continuously move downward by the self-weight, at a harmonious rate with the withdrawal. The repetitive experiments using the above cylinder, however, proved that the aforesaid deficiencies in the batch system were essentially unavoidable, since the polyester pellets in approximately the lower half of the cylinder were invariably perfectly fused and adhered.

Then, in order to prevent the fusion, a stirrer was mounted in the cylinder so as to agitate the entire area from the crystallization zone to the drying zone inside the cylinder, and the experiments were further repeated. The result was that the agitation was extremely difficult, and when sufficient agitation was forcibly performed, the pellets were inevitably adversely affected as to size and configuration, and fine powder was formed. Again, probably due to the non-uniform staying time of the pellets in the cylinder, the drying effect was markedly non-uniform.

Furthermore, agitation of the lower zone only of the cylinder, in which the fusion of particles took place under the temperature gradient as described in the early experiments, produced equally unsatisfactory results.

Finally it was discovered that, to our true surprise, all of the foregoing drawbacks are overcome at once, by crystallizing the noncrystalline polyester pellets at the higher side of normally employed polyester crystallization temperatures, preferably 150–190° C. under mechanical agitation, preferably of mild conditions, and drying the pellets past the crystallization zone by heating, without the agitation. In the invention, the term, mechanical agitation, is used to mean the agitation given by mechanical means such as a rod with stirring blades, excluding rotatory agitation in a rotary drum or that by fluidizing gas as employed in fluidized bed.

Accordingly, therefore, the object of the invention is to provide a drying process of polyester particles which present more problems to be solved in the drying step compared with other polymers, the process being free of the aforementioned numbers of drawbacks; and to provide apparatuses suited for practicing the said process.

Still other many objects and advantages of the invention will become clear from the following descriptions.

In the invention, the term, polyester particles, is used to cover polymer particles of any of normally employed configurations, such as granule, flake, pellet, and the like.

Also, "polyester" of the invention includes the typical polyesters such as those prepared from dibasic acids and dihydric alcohols, e.g., polyethylene terephthalate, and polyesters prepared from terephthalic acid and 1,4-cyclohexanedimethanol; as well as those containing, as the third component, optional dibasic acid or dihydric alcohol such as isophthalic acid, adipic acid, trimethylene glycol bis-phenol A, etc. as being copolymerized. Also the polyesters containing polyfunctional compounds such as pentaerythritol, the term poly-functional referring to at least tri-functional, and polyesters containing carbonate linkages such as polycarbonate, are within the scope of "polyester" used in the invention. In other words, the term is to cover all the polyesters which possess ester linkages, exhibit more or less the fusing phenomenon during the drying step, and which can be crystallized by heating.

The object of the subject process can be accomplished by the two-stage drying process which comprises the first step of heating and crystallizing non-crystalline polyester particles which are packed in such a manner that they are movable downwards by their own weight, at temperatures ranging 120–200° C., preferably 150–190° C., with mechanical agitation of preferably mild conditions as will not substantially deform the configuration of particles, until at least the surfaces of the particles are substantially crystallized, and the immediately succeeding step of heating and drying the particles, maintaining the packed state of the particles which are downwardly movable by their own weight, but without the mechanical agitation.

Under the above-described conditions of the invention, the highest feasible crystallization temperature is employed. While the specific temperature varies depending on the type of polyester and shape of the particles, normally temperatures ranging 120–200° C., preferably 150–190° C., are employed. At the temperatures below the lower limit, the crystallization of polyester particles is insufficient, and the occurrence of fusing phenomenon in the subsequent drying step under no agitation cannot be avoided. Also at temperatures above 200° C., more or less the decomposition of polyester is inavoidable.

According to the invention, the crystallization is performed until at least the surfaces of the polyester particles are substantially crystallized. This surface crystallization is easily discernible without special equipment, since upon the crystallization the particle surfaces become opaque, which is appreciable with naked eye. It is very important in this process that the polyester particles are maintained within the zone under the mechanical agitation until such opaqueness appears on the surfaces thereof, while they are packed in such a manner that they are movable downwards by their own weight, and that thereafter the particles are heated and dried while kept under the so packed state but without the mechanical agitation. The packed system as a whole gradually moves downwards by the self-weight, as the dried matter is withdrawn from a lower part of the apparatus.

In that case, the stirring action should not affect the particles being heated and dried, since such fails to achieve the objects of the invention. Whereas, if the mechanical agitation is stopped before the opaqueness observable with naked eye appears on the particle surfaces, neither the objects of the invention can be accomplished.

The heating is suitably performed by passing hot gaseous current through the crystallization and drying zones. In that case it is preferred to introduce the gaseous current separately into the two zones, inter alia, to introduce one current into the crystallization zone at the spot close to the feed entrance of the polyester particles, and another, into the drying zone at the spot close to the exit of the dried matter, discharging the exhaust currents from a spot between the two.

While air is the most conventional heating gas, other inert gases such as nitrogen, argon, carbon dioxide, etc. their mixtures, or mixtures of air with in inert gases, can be utilized if so desired.

The agitation in the crystallization zone is performed, preferably in such a manner as will avoid the exertion of positive pushing-down action on the polyester particles, in addition to the gradual downward movement thereof in the packed state which is caused by their own weight. For example, use of an agitation device as will push down the particles, such as the screw-type device with blades, should preferably be avoided. On the other hand, stirring as will somewhat suppress the downward movement of the particles by their own weight, i.e., such mechanical agitation as will not entirely inhibit the downward motion of the particles but exert thereon a slight lifting motion to a direction opposite from the downward movement, is permissible. If desired, the downward movement of the particles by their own weight, taking place with the withdrawal of the dried matter from a lower part of the apparatus, can be controlled to a certain degree by such lifting action of the agitation.

In the drying zone, the drying by heating must be performed in the absence of agitation. If any substantial agitation is given in this zone, the already described deficiencies cannot be prevented.

According to the subject process, continuous drying free of the aforementioned drawbacks is performable with very easy operations and apparatus of simple construction, and furthermore the operation which is inoperable with the conventional systems is practicalized. To wit, a compact apparatus suited for practicing the subject process can be directly mounted on the upper portion of the polyester pellet feeder of an extruder of spinning machine, for example, so as to completely avoid the disadvantages phenomena which tend to occur during the transfer of the dried pellets to the extruder.

Hereinafter apparatuses suitable for the practice of subject process will be explained with reference to the attached drawings for an easier understanding, and in the meantime the process will be explained in further details in connection with the apparatuses.

The apparatus for drying polyester particles, which is suitable for practicing the subject process, comprises a column in which noncrystalline particles of polyester are packed in such a manner that they are movable downwards by their self-weight, a feed entrance of the particles provided at an upper part of the column, crystallization zone in the upper area of the column in which the particles are heated until at least the surfaces thereof are substantially crystallized, an inlet for introducing a hot gaseous current into said zone, a stirrer for agitating the particles in said zone, a drying zone provided below and in succession to the crystallization zone, an inlet for introducing a hot gaseous current into the drying zone from a lower portion of the zone, an exit for the dried polyester particles provided at the bottom of the column, and at least one exhaust for the heating gaseous currents provided on the said column.

Referring to the drawings, FIG. 1 is a diagrammatic vertical section shown one embodiment of such an apparatus. FIGS. 2 and 4 show other embodiments of the apparatus in the similar manner, and FIGS. 3 and 4 show a modification of the apparatus of FIG. 2. FIG. 3' is a horizontal section cut along the line A—A of FIG. 3.

In FIG. 1, an example of forming the column from cylinder 7' with feed entrance 1 for the particles, cylinder 2 composing the crystallization zone, cylinder 8 of a greater diameter than that of the cylinder 2, provided below and in succession to the cylinder 2 to serve as the drying zone, and an adapter 7 which serves as the bottom of the column, is shown. In the cylinder 2 a mechanical stirrer 3 is equipped, which is rotated by motor 4 (shown by a side view, not as section). The rotation shaft is rotatably fixed on the upper part of the cylinder 7'. In this embodiment, a gas inlet 6 is provided on the upper portion of the cylinder 2, another gas inlet 9 and exit for the dried particles, on the adapter 7, and an exhaust 5 for the gaseous currents is provided on the upper part of cylinder 8.

Of course the column needs not be composed of such four members, but may be made of one to three members. Whereas, it is preferred that the cylinder 8 should have a diameter greater than that of the cylinder 2. The length of cylinder 8 is suitably at least approximately 5 times its inner diameter, normally approximately 5 to 6 times. Also in this embodiment the heated gaseous currents separately passing through the crystallization zone and drying zone are combined and discharged from a common exhaust 5, but if desired, they may be supplied from 9 to 5, respectively, and together withdrawn from 6. Or, an additional exhaust of the heating gaseous current may be provided at a lower portion of the crystallization zone.

FIG. 2 shows a modification of the embodiment of FIG. 1, in which the cylinder 2 is contained in the upper part of the cylinder 8. Also in this embodiment, the stirrer of the construction suited to give mild stirring action which is preferred for the subject process is employed. By rotating the stirrer with the spiral blade, which somewhat resembles an extended spring, to a suitable direction, a slight lifting motion can be exerted on the polyester particles present in the zone. If the stirrer is rotated to the counter-direction of the above, the same will push down the particles, which should be in all cases avoided.

In the embodiment, the stirrer is preferably installed at a position at which the lower end of the stirrer substantially corresponds with the lower end of the cylinder 2. Also when the inner diameter of cylinder 2 is expressed by $D_2$ and the rotation diameter of the stirring blade, by $D_2$, in the suitable designing the ratio $D_1/D_2$ becomes no more than 3.5, normally 3.0–2.0, in order to prevent the occurrence of tackiness, undesirable pulverization and/or deformation of the pellets which may be caused by the stirring.

The appropriate rotation rate differs depending on shape and arrangement of the blades, but for the specific type shown in FIG. 2, it is no more than 10 r.p.m., normally 10–2 r.p.m.

The cylinder 2 may be supported on the cylinder 8 by any suitable means, for example, by a flange 2' as shown in FIG. 2. Or, a suitable projection may be provided on the cylinder 8, and cylinder 2 may be mounted thereon with any suitable device such as a flange or arm. Conversely, suitable projection may be provided on the cylinder 2 and the cylinder 8, provided with a flange or arm, so that the former can be mounted on the latter. If desired, the two cylinders may be permanently fixed, but preferably the two are detachably fitted.

It is particularly advantageous to divide the upper space of cylinder 8 from its lower space substantially air-tight by means of flange 2' serving as a partition, since such will provide suitable passages through which the heated gas is forced to flow. Thus in the embodiment of FIG. 2, non-crystalline polyester particles are fed from entrance 1, and the dried particles are continuously withdrawn from the exit 10. In the meantime the particles move downwards by their own weight, maintaining the movably packed state. The non-crystalline polyester particles in the cylinder 2 are crystallized by the heated gaseous current fed from the inlet 6 and flowing through the spaces 12 and 13 downwards in the cylinder 2, while being stirred, under the mildest feasible agitation condition, by the stirrer 3, and move into the drying zone below. Into the drying zone, separately a heated gaseous current is fed from the inlet 9 and rises through the same zone. The gaseous current flowing down through the cylinder 2 and that flowing up through the drying zone are combined, and discharged from the exhaust 5 as shown by the arrow in the drawing.

The adapter 7 is preferably installed in such a manner as will form an annular space 11 at the lower end portion of cylinder 8 as illustrated in FIG. 2, the space 11 contributing to uniformize the supply of gaseous current for drying into cylinder 8, and consequently to effect uniform heating the inlet 9 for the hot gaseous current is opened to the annular space with advantage. This also applies to the inlet 6, that is, the inlet 6 is preferably opened to the annular space 11' which is located at a position lower than the upper rim of the cylinder 2. Similarly, it is recommended that the exhaust 5 of the gaseous currents should be provided to open to the annular space 11" formed by the lower rim of cylinder 2, flange 2' and cylinder 8.

Thus the gaseous currents are forced to flow through the optimum paths.

FIG. 4 shows another embodiment of the apparatus which is similar to that of FIG. 2, except that the stirrer is of the type similar to that shown in FIG. 1. In this embodiment, the circulation path of the heated gaseous current outside the apparatus is also illustrated.

Furthermore, in FIG. 4 a modification at the lower end portion of cylinder 2 is indicated with broken lines. In the modified embodiment, the lower end portion of cylinder 2 is enlarged or spread out downwards. The design like the spreading portion 18 smoothes the downward transfer of the packed polyester particles by their own weight, and serves to prevent uneven staying or clogging of the particles in cylinder 2. Furthermore, the lower end portion of cylinder 2 may be left intact as illustrated in FIG. 2, but the portion corresponding to the spreading portion 18 of FIG. 3 may be bored with numerous perforations to allow passage of air therethrough. Whereby the gaseous current flowing downwards through the cylinder 2 and that flowing upwards through cylinder 8 can together flow into the annular space 11' from the perforations as well as from the gap between the cylinders 2 and 8. This prevents dried polyester particles from being carried away to the exhaust 5 by the violent gaseous flow which apts to be formed when the flow rate of the gaseous currents is high, in case the sole exit of the currents is the gap between the two cylinders. The configuration of the perforations is not critical, which may be slit-type small holes. The term is used in the sense inclusive of any shape of through-holes allowing passage of gases. It is of course possible to design the apparatus to have both the spreading portion 18 as shown in FIG. 4 and the numerous perforations.

Again in order to prevent the non-crystalline polyester particles from being pre-heated before their introduction into the crystallization zone, by the heated gaseous current for crystallizing, to the state which is apt to cause fusion although by a slight degree, in a preferred embodiment a suitable portion of the column below the level of particles' feed entrance but above the crystallization zone is cooled. In FIGS. 2, 3 and 4, such a cooling jacket 23 is shown. In the drawings, the numeral 24 denotes a pipe for supplying a cooling medium, such as cold water, brine, etc., into jacket 23. Also if so desired, the exterior of the heated zone of the column, i.e. crystallization zone and/or the drying zone, may be covered with a jacket, so that the column can be additionally heated through the outer walls.

One example of the circulation of heated gaseous current will be explained with reference to FIG. 4. The gaseous current discharged through the exhaust can be passed through a cyclone 22 and blower 19, and heated by the heater 20 to be recycled to the inlet 6 into the crystallization zone and inlet 9 into the drying zone.

FIGS. 3 and 3' show still another embodiment of the apparatus of the invention, to which a further additional means is provided.

The embodiment is generally similar to that of FIG. 2, except that a crumbling means of blocks is provided at the upper portion of the drying zone, in the manner of traversing the same zone. Although according to the process and apparatus of the invention, the particles never form the objectionably large size, fused blocks as already described in detail, small size, fused particles may be formed during the initiating stage of the process or under abnormal conditions such as faulty temperature control of the gaseous current, breakage of stirring blade, faulty flow rate control of the current, and the like. Of course such abnormal situation seldom takes place, but provision of a prevention means of the possible fused block formation is desirable, particularly in case the apparatus is directly connected to the pellet feeder to an extruder of a spinning machine.

In this embodiment a plural number of rotary rolls 14—14 are rotatably fitted on the same plane, each piercing through the cylinder 8. Each roll 14 has plural projections thereon disposed along its length, each projection being shifted from the adjacent projection by 90°, as illustrated in FIGS. 3 and 3'. Also between any two adjacent rolls, any two corresponding projections are shifted by 90° from each other. All of those rolls are rotatable at a same rate.

The design may be best understood with reference to FIG. 3', in which plural rotation rolls 14—14 are provided, each traversing the cylinder 8 which serves as the drying zone in the column 7'. Each roll 14 has plural projections 17—17 at equal intervals and at right angle against the roll, each projection being shifted from the preceding projection by 90°. Between any two adjacent rolls, any two corresponding projections are also shifted from each other by 90°. Also each of the outermost rotatory rolls 14 facing the inner wall of cylinder 8 is rotated to such direction as will push down the particles *a* through the space between the inner wall of cylinder 8 and the same roll. Preferably this crumbling means is provided directly below the cylinder 2, for easier breaking of the blocks *a'*. In FIG. 3, 16—16 are the bosses fixed on the wall of cylinder 8 to support the rotary rolls 14—14, 15—15 are gears, and 13 is a chain wheel. The direction of rotation of each roll is indicated with an arrow in FIG. 3'. The directional arrangement as indicated is preferred, because such does not interfere with the downward motion of the particles by their own weight, but rather assists the movement with uniform staying time of individual particles. Thus, by rotating the rolls 14—14 having plural projections 17—17, small size fused blocks *a'* can be crumbled.

The foregoing explanations being given as to cylinder-type apparatus, the apparatus may be of conical or square-pole form, or of inclined vertical form so far as the downward motion of the particles by their own weight is not hindered.

When the process of this invention is practiced with an apparatus as above-described, the polyester particles can be continuously crystallized and dried, perfectly preventing the fusion of particles, with excellent qualitative reproducibility. Furthermore the apparatuses as above-described are markedly simplified in their construction, and small in size. They can be easily manufactured, disassembled and assembled; their maintenance is simple; and installation cost is low. Particularly, they can be installed directly in series with the particle feeder of spinning machine or other shaping machines, which has heretofore been long desired but could not be realized with conventional drying machines.

Hereinafter a working embodiment of the subject process will be explained with reference to an example.

EXAMPLE

Particles of polyethylene terephthalate having an intrinsic viscosity of 0.98 as measured in the orthochlorophenol solution as 25° C. were subjected to a continuous drying by employing the apparatus shown in FIG. 2. Thereafter, the dried particles were directly fed to an ordinary spinning apparatus provided with an extruder and undrawn filaments were thus prepared.

The main operation conditions were as follows:

Particles:
    Size—4 x 4 x 2 m./m.
    Water content—0.5% by weight
    Intrinsic viscosity—0.98
    Amount discharged (introduced)—80 kg./hr.
Heated air for crystallization:
    Amount circulated—6 m.³/min.
    Inlet temperature—170° C.
Heated air for drying:
    Amount circulated—6 m.³/min.
    Inlet temperature—170° C.
Agitation shaft inside crystallization cylinder:
    Form—Spiral blade
    Rotation rate—3.8 r.p.m.
Residence (drying) time:
    Crystallizing cylinder—0.8 hr.
    Drying cylinder—8 hrs.

Spinning conditions:
Spinning temperature—295° C.
Denier of undrawn filament—6300

The results of the above operation are as follows:

Dried particles:
Size—Not changed
Water content—Below 0.001 (as measured by Karl Fisher's method)
Intrinsic velocity—0.96
Fluctuation range of intrinsic viscosity—0.01

Undrawn filament:
Intrinsic viscosity—0.89
Fluctuation range of intrinsic viscosity—0.02

Throughout the long-time continuous operation under the above mentioned conditions there was not observed any stuffing or other trouble resulting from occurrence of the adhesion or fusion of the particles in the crystallization cylinder. Further, there was not observed any accumulation of purvelized fine powder in a cyclone fine particle collector provided outside the cylinder.

For comparison sake, the operation was repeated under the same conditions as above except the absence of the agitation shaft provided inside the crystallization cylinder. In this run, fused and adhered particles were deposited on the inner surface of the crystallization cylinder taking a configuration corresponding to the form of the cylinder, and about 90 minutes after the commencement of the operation the pressure balance of the circulated air in the cylinder was lost and the continuous operation became impossible.

For another comparison's sake, the drying was performed by employing the conventional rotary drum drier, the dried particles were fed to the spinning apparatus through a transfer pipe and a particle-maintaining hopper provided in the upper portion of the spinning apparatus, and thereafter the spinning was performed under the same conditions as above. The results of this run are as follows:

Dried particles:
Size—Not changed
Water content—Below 0.02 (as measured by Karl Fisher's method)
Intrinsic viscosity—0.97
Fluctuation range of intrinsic viscosity—0.02

Undrawn filament:
Intrinsic viscosity—0.85
Fluctuation range of intrinsic viscosity—0.035

We claim:
1. A process for drying and crystallizing polyester particles which comprises introducing moist noncrystalline polyester particles to an inlet in the upper part of a column, said upper part being a crystallization zone and the lower part provided below and in succession to said crystallization zone being a drying zone; heating and crystallizing in said crystallization zone the non-crystalline polyester particles which are packed in such a manner that they move downwardly by their own weight, at temperatures between 120° and 200° C. while mildly agitating said particles so as neither to substantially deform them before their surfaces are substantially crystallized nor to push them downwardly, then heating and drying said particles without mechanical agitation in said drying zone and recovering the dried particles at an exit near the bottom of said zone; said heating in the crystallization and drying zones being performed by introducing a heated current of gas selected from the group consisting of air, nitrogen, argon, carbon dioxide and mixtures thereof separately into each zone, the gas in the crystallization zone being introduced near the feed entrance of said polyester particles and the gas in the drying zone being introduced near the exit of the dried matter and discharging the exhaust currents at a point between the inlet and exit of the polyester particles.

2. A process according to claim 1 wherein the heating temperature is between 150 and 190° C.

References Cited

UNITED STATES PATENTS

| | | | |
|---|---|---|---|
| 3,014,011 | 12/1961 | Zoetbrood | 260—75 |
| 3,305,532 | 2/1967 | Middleburg et al. | 260—75 |
| 3,405,098 | 10/1968 | Heighton et al. | 260—75 |

WILLIAM H. SHORT, Primary Examiner

M. GOLDSTEIN, Assistant Examiner

U.S. Cl. X.R.

23—283, 284